(12) United States Patent
Caillot et al.

(10) Patent No.: US 10,276,991 B2
(45) Date of Patent: Apr. 30, 2019

(54) CONNECTORS FOR A WINDSCREEN WIPER OF A VEHICLE

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR); Guillaume Barret, Laps (FR); Xavier Bousset, Mezel (FR); Denis Thebault, Clermont Ferrand (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 631 days.

(21) Appl. No.: 14/577,349

(22) Filed: Dec. 19, 2014

(65) Prior Publication Data

US 2015/0175131 A1    Jun. 25, 2015

(30) Foreign Application Priority Data

Dec. 20, 2013 (FR) ...................................... 13 63275

(51) Int. Cl.

| H01R 13/73 | (2006.01) |
|---|---|
| B60S 1/38 | (2006.01) |
| F16L 33/00 | (2006.01) |
| B60S 1/52 | (2006.01) |
| F16L 21/00 | (2006.01) |

(52) U.S. Cl.
CPC ............ *H01R 13/73* (2013.01); *B60S 1/3805* (2013.01); *B60S 1/3862* (2013.01); *B60S 1/524* (2013.01); *F16L 21/00* (2013.01); *F16L 33/00* (2013.01)

(58) Field of Classification Search
CPC .............................. B60S 1/3862; B60S 1/3805

USPC ....................................................... 15/250.04
See application file for complete search history.

(56) References Cited

U.S. PATENT DOCUMENTS

2013/0298348 A1 * 11/2013 Caillot .................. B60S 1/3805
                                                        15/250.32

FOREIGN PATENT DOCUMENTS

| DE | 10 2011 050104 A1 | 11/2012 | |
|---|---|---|---|
| DE | 102012104906 A1 * | 12/2013 | ............ B60S 1/3805 |
| EP | 2402222 A1 | 1/2012 | |
| EP | 2460700 A1 | 6/2012 | |
| EP | 2607187 A1 | 6/2013 | |
| FR | 2964619 A1 * | 3/2012 | ............ B60S 1/3805 |
| FR | 2964620 A1 * | 3/2012 | ............ B60S 1/3805 |
| FR | 2971470 A1 | 8/2012 | |

(Continued)

OTHER PUBLICATIONS

DE102012104906A1 (machine translation), 2013.*

(Continued)

*Primary Examiner* — Andrew A Horton
(74) *Attorney, Agent, or Firm* — Osha Liang LLP

(57) ABSTRACT

Electrical, hydraulic and mechanical connectors for a windscreen wiper of a vehicle are disclosed. The electrical connector includes a body bearing electrical plugs and detachable fixing means which are configured to cooperate with the mechanical connector. The hydraulic connector does not comprise such means and is fixed to the mechanical connector solely by the interlocking of its small tubes in the mechanical connector. The mechanical connector comprises two substantially parallel tabs having at their free ends notches for the fixing means of the electrical connector to be resiliently clipped thereto.

17 Claims, 3 Drawing Sheets

(56) References Cited

FOREIGN PATENT DOCUMENTS

WO        2012/072299 A1    6/2012
WO    WO 2012072300 A1 *  6/2012  ............ B60S 1/3862

OTHER PUBLICATIONS

FR2971470A1 (machine translation), 2012.*
WO2012072300A1 (machine translation), 2012.*
FR2964619A1 (machine translation), 2012.*
FR2964620A1 (machine translation), 2012.*
EP2402222A1 (machine translation) (Year: 2012).*
Preliminary Search Report issued in corresponding French Patent Application No. 1363275 dated Oct. 21, 2014 (8 pages).

* cited by examiner

CONNECTORS FOR A WINDSCREEN WIPER OF A VEHICLE

TECHNICAL FIELD

The present invention relates to connectors, in particular electrical, hydraulic and mechanical connectors, for a windscreen wiper of a vehicle, in particular a motor vehicle, as well as a windscreen wiper comprising at least one of said connectors.

PRIOR ART

Motor vehicles are generally provided with windscreen wiper systems to ensure the wiping and washing of the windscreen and to prevent distorting the view of the driver of the surrounding area. These systems comprise arms carrying out an angular reciprocal movement, elongated windscreen wipers are installed at the end of said arms which in turn bear scraper blades produced from a resilient material. The blades scrape against the windscreen and remove water by driving it out of the field of vision of the driver.

Windscreen wiper systems may comprise projection means for projecting windscreen washer fluid onto the windscreen. Said projection means may be located on the engine hood, on the grille of the windscreen frame or, in a more recent version, on the windscreen wipers, in particular wipers of the flat blade type, i.e. wipers which have an inherent curvature, enabling them to be mounted on the arms without using clips or stirrups.

In the case of projection means integrated in the wiper, the windscreen washer fluid is conducted as far as the projection means, such as nozzles, via conduits fixed to the arm and connected by a hydraulic connector to a system for distributing fluid integrated in the mechanical connector of the wiper, said mechanical connector enabling an articulated connection to be established between the arm and the wiper.

The patent application FR 2 971 470 of the applicant discloses a hydraulic connector of this type. FIGS. 2 and 3 of the present application are figures taken from this previous application and disclose a hydraulic connector 10 fixed to a mechanical connector 12 in FIG. 2 and detached from said mechanical connector in FIG. 3. The hydraulic connector 10 comprises two small tubes 14 each having a tubular inlet end 14*a* which is configured to be connected to a conduit for fluid 16 and a tubular outlet end 14*b* which is configured to be connected to the mechanical connector 12 of the wiper. The mechanical connector 12 comprises tubular end pieces 18 designed to receive by interlocking the tubular outlet ends 14*b* of the small tubes 14 of the hydraulic connector 10.

It is also known to integrate heating means in the wiper, in particular for the windscreen washer fluid. Heated fluid may thus be projected onto the windscreen of the vehicle which is advantageous in winter to limit the formation of ice on the windscreen and to accelerate the removal thereof when starting up the vehicle. The heating means integrated in the windscreen wiper also enable the structure to be reheated in order to operate the scraper blade in optimal conditions and to de-ice the wiper so as to avoid the accumulation of snow and the blockage of the nozzles along the windscreen wiper.

The windscreen wiper thus integrates heated electrical conductors which are supplied with electricity by electrical wires fixed to the arm and connected by an electrical connector to an electrical connection system integrated in the mechanical connector of the wiper.

The aforementioned patent application FR 2 971 470 discloses an electrical connector of this type (see FIGS. 2 and 3 from this previous application). The electrical connector 20 comprises a body 22 bearing electrical connecting plugs 24 which are configured to be connected by interlocking with complementary plugs 26 of the mechanical connector 12 of the wiper.

In the prior art shown in FIGS. 2 and 3, and also in FIGS. 4 to 7, the electrical connector 20 comprises means 28 for fixing onto the hydraulic connector 10 which in turn comprises means 30 for fixing to the mechanical connector 12 of the wiper. In other words, the electrical connector 20 is fixed and retained on the mechanical connector 12 by means of the hydraulic connector 10. The means 28 for fixing the electrical connector 20 to the hydraulic connector 10 comprise parallel rails 32 borne by the body 22 of the electrical connector 20 and designed to cooperate by longitudinal sliding with parallel slide rails 34 borne by the hydraulic connector 10. The means 30 for fixing the hydraulic connector 10 to the mechanical connector 12 comprise pins 36 designed to cooperate with notches 38 of tabs 40 of the mechanical connector 12, by being resiliently clipped thereto. The tabs 40 of the mechanical connector 12 are parallel and symmetrical relative to a central longitudinal plane of the mechanical connector 12. The tabs 40 have said notches 38 at their free ends. It is observed in FIGS. 3 and 4 that the tubular end pieces 18 of the mechanical connector 12 have longitudinal axes contained in a plane P1 which passes through said notches 38. The plugs 26 of the mechanical connector 12 have longitudinal axes contained within a plane P2 parallel to the plane P1 (FIG. 3).

The prior art disclosed above, however, has drawbacks. Mounting clearances exist between the plugs 24 of the electrical connector 20 and those 26 of the mechanical connector 12. During operation, vibrations from the vehicle may be transmitted by the arm to the wiper and may cause the occurrence of micro-movements between the plugs 24, 26 and generate the phenomenon of wear of the contact surfaces between said plugs (by "fretting corrosion"), which may ultimately be translated into a loss of the electrical supply to the wiper. Moreover, the electrical connector 20 is not effectively retained in the longitudinal direction by the hydraulic connector 10 and may be displaced in the longitudinal direction, promoting the occurrence of the aforementioned micro-movements.

The present invention proposes a simple, efficient and economical solution to at least some of these drawbacks.

DESCRIPTION OF THE INVENTION

The invention proposes an electrical connector for a windscreen wiper of a vehicle, in particular a motor vehicle, comprising a body bearing electrical connecting plugs, characterized in that said body comprises first means for fixing in a detachable manner which are configured to cooperate with a mechanical connector of said wiper, said first means for fixing being independent of said plugs.

In the present application, "means for fixing" is understood as means ensuring the fixing and retention of one element relative to another element. A simple interlocking is not considered here as fixing unless the means for interlocking one element in another element comprise means for locking designed to cooperate directly with said other element.

Thus, the electrical connector according to the invention is directly fixed to the mechanical connector and retained in position thereby, which was not the case in the prior art (in which the electrical connector was fixed to the mechanical connector by means of the hydraulic connector). This fixing is ensured by means for fixing borne by the body of the electrical connector and which are independent of the plugs borne by this body, which are generally designed to cooperate by interlocking with complementary plugs of the mechanical connector. This is particularly advantageous as this enables the relative micro-movements between the electrical and mechanical connectors to be restricted or even eliminated and to provide a permanent electrical connection therebetween.

Said first means for fixing of the electrical connector preferably protrude from said body. The first means for fixing may be configured to cooperate with said mechanical connector by being resiliently clipped thereto.

The first means for fixing of the electrical connector may comprise two pins. Said pins may be substantially coaxial and/or cylindrical. They preferably extend in substantially opposing directions. The axes of the pins and the plugs may extend in the same plane.

The body of the connector may have a generally parallelepipedal shape, one front face thereof being connected to said plugs and two lateral opposing faces being connected to said first means for fixing.

The electrical connector may comprise second means for fixing, preferably by being resiliently clipped onto a hydraulic connector of said wiper, said first and second means for fixing preferably being independent.

The electrical connector is thus fixed by being resiliently clipped onto the hydraulic connector (and not by longitudinal sliding, as in the prior art) which may enable, in particular, the longitudinal space requirement of the electrical connector to be reduced.

The body of the electrical connector may comprise retaining means which are configured to cooperate by abutment with the hydraulic connector. Said retaining means are preferably independent of the first and second retaining means.

The present invention further relates to a hydraulic connector for a windscreen wiper of a vehicle, in particular a motor vehicle, comprising at least one small tube having a first tubular inlet end which is configured to be connected to a conduit for fluid and a second tubular outlet end which is configured to be connected to a mechanical connector of said wiper, characterized in that, other than said second tubular end, it does not comprise means for fixing in a detachable manner which are configured to cooperate with said mechanical connector of said wiper.

Thus it is understood that the only means for directly connecting the hydraulic connector to the mechanical connector are formed by the second tubular end of the or each small tube of the hydraulic connector.

The hydraulic connector may have a transverse wall comprising a front face located on the side of said first tubular end and which is configured to cooperate by abutment with said retaining means of said electrical connector.

Thus it is understood that, according to the invention and in contrast to the prior art, the hydraulic connector is fixed to the mechanical connector and retained relative thereto by means of the electrical connector. In contrast to the electrical connector, it is less important that the hydraulic connector is fixed directly to the mechanical connector as the sealing joints which are generally provided between the hydraulic and mechanical connectors are sufficient to provide a good seal of the fluidic connection, even if the hydraulic connector is subjected to vibrations during operation.

The hydraulic connector may comprise two small tubes, said transverse wall extending substantially between said small tubes.

The present invention further relates to a mechanical connector for a windscreen wiper of a vehicle, in particular a motor vehicle, comprising electrical connecting plugs which are configured to cooperate with complementary electrical connecting plugs of an electrical connector, and at least one end piece for the fluidic connection which is configured to cooperate with a second tubular outlet of a small tube of a hydraulic connector, said plugs of the mechanical connector having longitudinal axes contained within a plane P, said mechanical connector further comprising two substantially parallel tabs having at their free ends notches for resilient clipping, characterized in that said plane P passes through said notches.

The present invention finally relates to a windscreen wiper of a vehicle, in particular a motor vehicle, characterized in that it comprises an electrical connector as disclosed above, a hydraulic connector as disclosed above and/or a mechanical connector as disclosed above.

DESCRIPTION OF THE FIGURES

The invention will be understood more clearly and further details, features and advantages of the invention will appear from reading the following description made by way of non-limiting example and with reference to the accompanying drawings, in which.

DETAILED DESCRIPTION

It should be noted that the figures describe the invention in a detailed manner in order to implement the invention, said figures naturally being able to be used to define the invention more clearly if required.

In the following description, the terms "longitudinal" or "lateral" refer to the orientation of the windscreen wiper according to the invention. The longitudinal direction corresponds to the principal axis of the wiper in which it extends, whilst the lateral orientations (respectively front and rear) correspond to concurrent straight lines, i.e. which intersect the longitudinal direction, in particular perpendicular to the longitudinal axis of the wiper in its rotational plane. For the longitudinal directions, the terms "external" or "internal" are interpreted relative to the fixing point of the wiper on the wiper carrier arm, the term "interior" corresponding to the part where the arm and a half-wiper extend. Finally, the directions referred to as "upper" or "lower" correspond to orientations perpendicular to the plane of rotation of the wiper blade, the term "lower" containing the plane of the windscreen.

Figure 1:
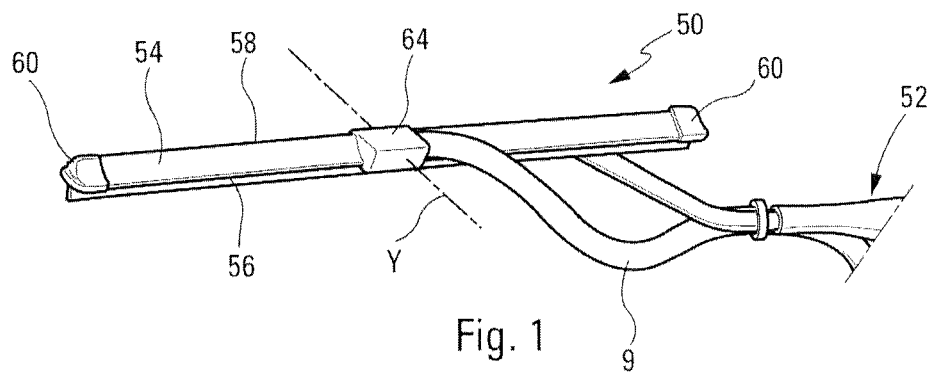
FIG. 1 is a schematic perspective view of a windscreen wiper system of a vehicle which comprises means for supplying electricity and windscreen washer fluid to the windscreen wiper.
Figure 2:
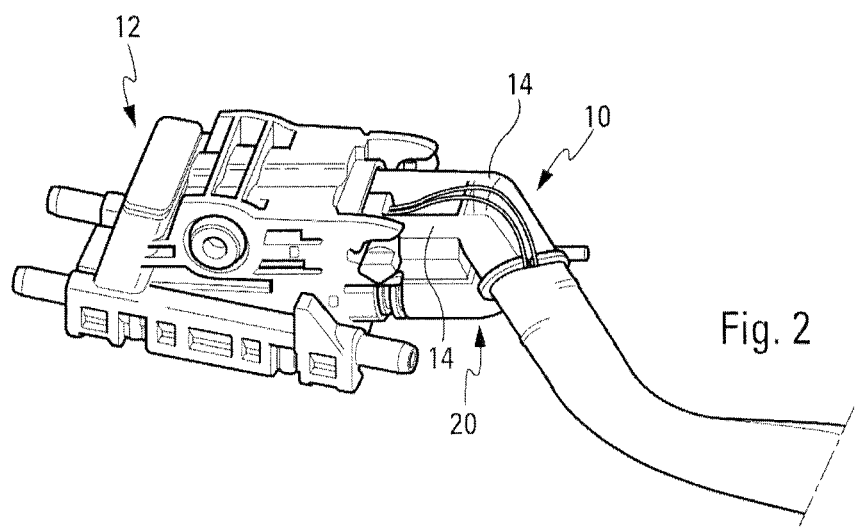
FIG. 2 is a schematic perspective view of connectors of a windscreen wiper according to the prior art.

A windscreen wiper system of a vehicle, in particular a motor vehicle is illustrated in FIG. 1. Said system comprises a windscreen wiper 50 for the windscreen and a drive arm 52 for said wiper which is partially shown and designed to be driven by a motor to follow an angular reciprocal movement, enabling water and potentially other undesirable elements covering the windscreen to be removed.

In the known manner, the wiper 50 comprises a longitudinal body 54, a scraper blade 56 generally made of rubber and at least one stiffening member (not visible) which provides the blade 56 with a curvature in order to promote the application of said blade onto the windscreen. The body 54 of the wiper 50 comprises an upper aerodynamic deflector 58 designed to improve the operation of the windscreen wiper system, the object of said deflector being to improve the pressure of the wiper against the windscreen and thus the aerodynamic performance of the system.

The wiper 50 further comprises end pieces or clips 60 for hooking the blade 56 and the member onto the body, said clips 60 being located at each of the longitudinal ends of the body 54.

Figure 8:
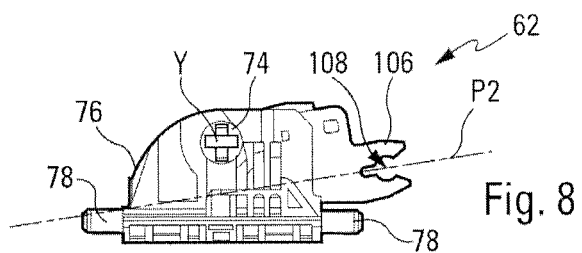
FIG. 8 is a schematic side view of a mechanical connector of a windscreen wiper according to an embodiment of the invention.

The body 54 of the wiper in this case is produced in two separate parts which are arranged substantially end to end and connected together by an intermediate mechanical connector 62 (shown in FIG. 8). Said mechanical connector 62 is thus interposed between the two parts of the body 54.

To provide its mounting on the arm 52, the wiper 50 comprises an adapter (not shown) mounted on the connector 62 and permitting an articulation of the wiper 50 relative to the arm 52. The articulation of the wiper 50 relative to the arm 52 is an articulation according to a rotational movement about an axis of rotation Y perpendicular to the longitudinal axis of the wiper 50. More specifically, the wiper 50 has to have at least one degree of freedom in rotation relative to the arm 52, and more particularly relative to a terminal part 64 of the arm 52 to permit the wiper 50 to follow the curvature of the windscreen.

The wiper 50 comprises projection means (not shown) for projecting windscreen washer fluid onto the windscreen, such as sprayer manifolds, and means (not shown) for heating the windscreen wiper 50.

The projection means are supplied with windscreen washer fluid by a fluid distribution system integrated in the mechanical connector 62, which in turn is supplied with windscreen washer fluid by a hydraulic connector 66 (FIGS. 10 to 14) connected by a conduit 68 (FIG. 1) to a pump and to a windscreen washer fluid tank of the vehicle.

In this case, the windscreen wiper 50 is provided with two sprayer manifolds (not shown) which are located on each side of the wiper. Each manifold is provided with a pressurized nozzle or a plurality of pressurized nozzles or pressurized spray orifices, permitting the distribution of the windscreen washer fluid onto the windscreen.

During operation, windscreen washer fluid is conducted solely on the front part of the wiper, i.e. windscreen washer fluid is conducted onto the sprayer manifold located on the side on which the arm of the windscreen wiper advances during an ascending wiping phase and on the other side during the descending wiping phase. This arrangement permits windscreen washer fluid to be wiped away immediately after being deposited on the windscreen, thus eliminating any period of time during which visibility might have been reduced.

The means for heating comprise one or more heated electrical conductors, produced in a resistive material, which are supplied with electricity by an electrical connection system integrated in the mechanical connector 62, which in turn is supplied with electricity by an electrical connector 70 (FIGS. 9 and 11 to 14) connected by electrical wires 72 to a computer of the vehicle.

The windscreen wiper 50 may comprise a heated resistive film borne by the stiffening member of the wiper and connected by the electrical connection system of the mechanical connector 62 to the electrical connector 70.

The mechanical connector 62 is fixed in a captive manner to the wiper 50 so as to provide in this manner the transmission of mechanical force from the arm 52 to the wiper 50. It has a substantially parallelepipedal shape extending in the axis of the wiper, with two lateral flanks from which extend laterally two pins 74 which have the function, on the one hand, of fixing the mechanical connector 62 to the adapter (not shown) and, on the other hand, of being used as an axle for the rotation of the wiper 50 relative to the arm 52.

On the outside, the mechanical connector 62 has a wall 76 denoted as a cap which firstly closes the front part of the terminal part 64 and acts as a screen to protect the components contained inside this terminal part 64, and secondly provides an attractive external finish. The face of the connector 62 opposing the cap 76, called the internal face, comprises tubular end pieces for the hydraulic connection and electrical connecting plugs which are configured to cooperate respectively with complementary means of the hydraulic connector 66 and of the electrical connector 70.

Figure 3:
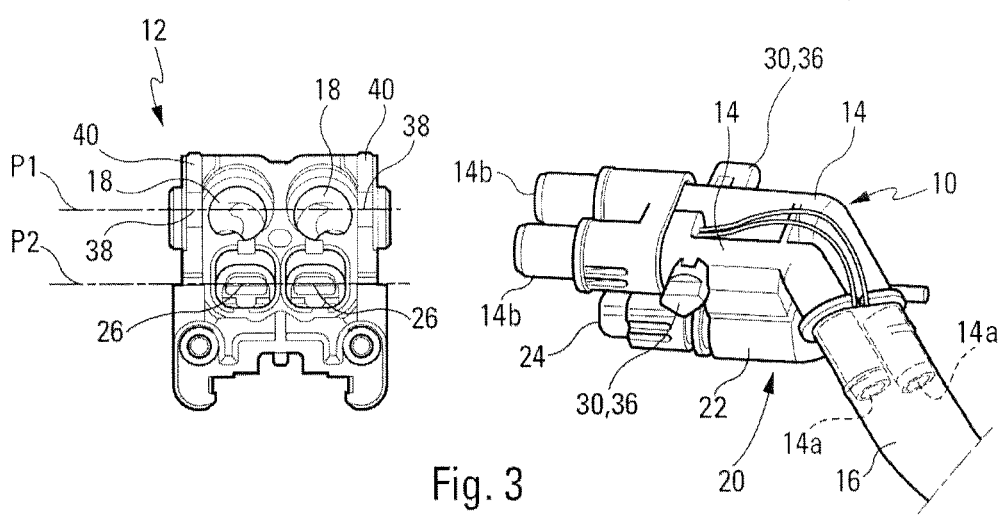
FIG. 3 is a further schematic perspective view of the connectors of FIG. 2, the hydraulic and electrical connectors being separated from the mechanical connector and said connector being seen from the front.
Figure 4:
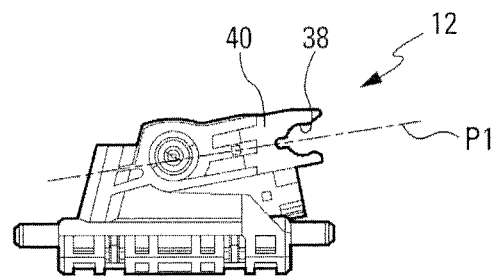
FIG. 4 is a further schematic side view of the mechanical connector of the windscreen wiper according to the prior art.
Figure 5:
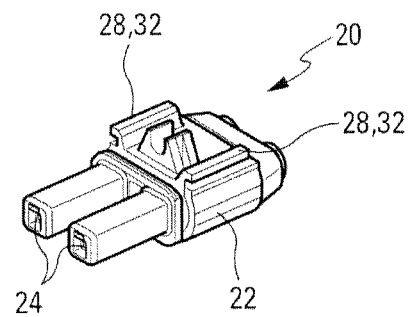
FIGS. 5 and 6 are schematic perspective views of the electrical and hydraulic connectors, respectively, of the windscreen wiper according to the prior art.
Figure 6:
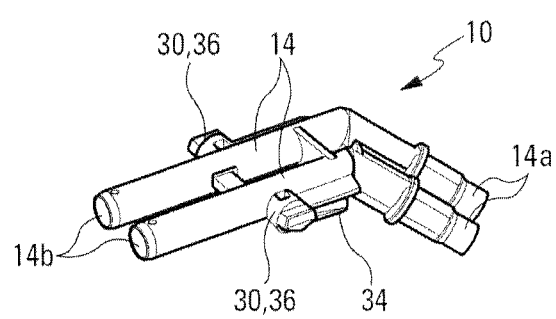
Figure 7:
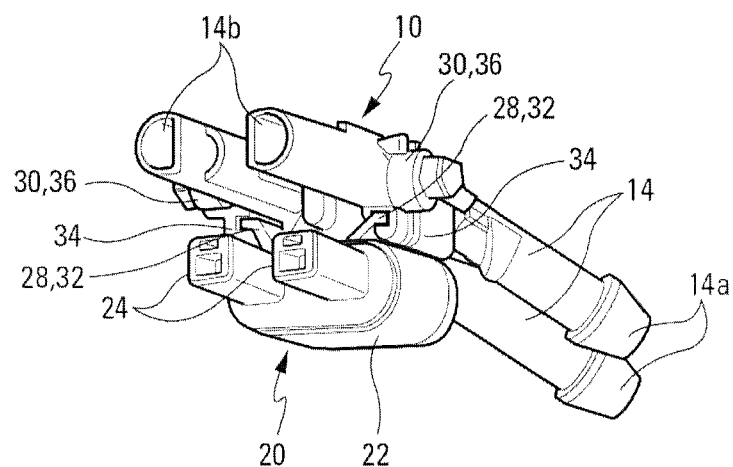
FIG. 7 is a further schematic perspective view of the electrical and hydraulic connectors of FIGS. 5 and 6 which are fixed together here.

This internal face of the mechanical connector 62 comprises two tubular end pieces which are substantially identical to the tubular end pieces 18 visible in FIG. 3 which represents the prior art. Said tubular end pieces are extended by internal channels for distributing windscreen washer fluid (not shown) running inside the mechanical connector 62 to discharge in a manner perpendicular to conduits 78 for supplying the sprayer manifolds of the wiper 50.

The internal face of the mechanical connector 62 comprises two plugs which are also substantially identical to the plugs 26 visible in FIG. 3 which represents the prior art.

Figures 9, 10:
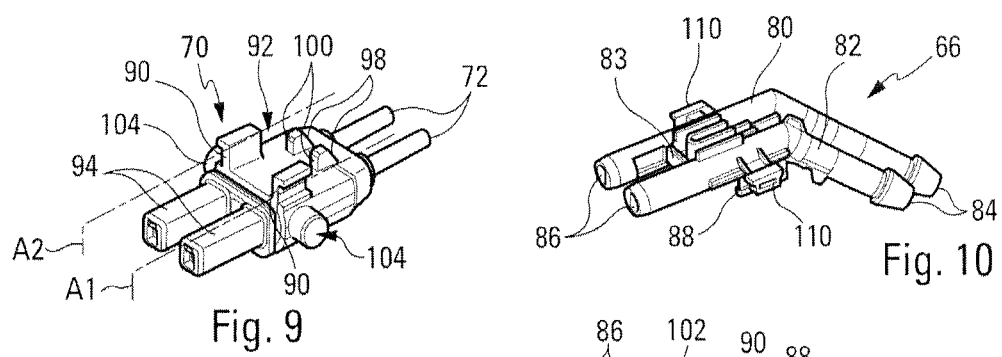
FIGS. 9 and 10 are schematic perspective views of the electrical and hydraulic connectors, respectively of the windscreen wiper according to the invention.

The hydraulic connector 66 provides the supply of windscreen washer fluid to the mechanical connector 62. It is in the form of two small tubes 80, 82 positioned in parallel and connected longitudinally and mechanically to one another by fastening bridges or connecting bridges 83 (FIG. 10). By way of example, when the small tube 80 or 82 forms a tube of cylindrical section, the direction of extension of the small tube is formed by a straight line centred in the cylindrical section.

Said small tubes 80, 82 each comprise two sectors (respectively internal and external) which extend in directions oriented at an angle relative to one another, the join between said sectors forming an elbow. Such a structure enables the shape of the small tubes 80, 82 to be adapted to the shape of the terminal part 64 below which they are positioned. On the internal side, said small tubes 80, 82 each comprise a first tubular inlet end 84 onto which is pushed the conduit 68 for supplying windscreen washer fluid. On the external side, each of the small tubes 80, 82 has a second tubular outlet end 86 of cylindrical shape capable of being inserted into one of the tubular end pieces of the internal face of the mechanical connector 62. O-rings (not visible) may be positioned in the vicinity of said second ends 86 to provide the seal between the small tubes 80, 82 and the end pieces in which they penetrate. The second ends 86 of the small tubes 80, 82 cooperate in this case by interlocking with the end pieces of the mechanical connector 62, said interlocking being of the male-female type, the second ends 86 being of the male type and the end pieces of the connector 62 being of the female type.

At its lower part, the hydraulic connector 66 comprises means for fixing 88 configured to cooperate by being resiliently clipped onto complementary means for fixing 90 of the electrical connector 70. In this case, the means for fixing 88 comprise two hooks which are parallel and remote from one another. They extend substantially parallel to the longitudinal axes of the external sectors of the small tubes 80, 82 and extend downwardly from said external sectors. Each hook comprises a planar longitudinal wall connected at its free lower end to a lateral edge oriented toward the other hook and forming a hooking tooth. The hooks are resiliently deformable, in particular in flexion, so that their hooking teeth may, in particular, be separated from one another.

The electrical connector 70 provides the electrical power required for the operation of the heating elements integrated in the wiper. It comprises a body 92 of generally parallel-epipedal shape which comprises a front face, a rear face, two lateral faces and respectively upper and lower faces. The electrical connector 70 comprises two plugs 94 which are connected to the front face of the body 92 of the connector and which are connected to the electrical wires 72 which pass through orifices of the rear face of the body 92. The plugs 94 are in this case formed by hollow tubes in which metal connectors connected electrically to the wires 72 are positioned.

The body 92 of the electrical connector 70 comprises on its upper face the aforementioned means 90 for fixing to the hydraulic connector 66. The means for fixing 90 comprise in this case two hooks which are parallel and remote from one another. They extend respectively in the planes A1, A2 parallel to one another and to the longitudinal axes of the plugs 94. They extend upwardly from the upper face of the body 92 of the connector 70. Each hook comprises a planar longitudinal wall connected at its upper free end to a lateral edge oriented toward the other hook and forming a hooking tooth. The hooks are resiliently deformable, in particular in flexion, so that their hooking teeth may, in particular, be brought together.

Figures 11, 12, 13:
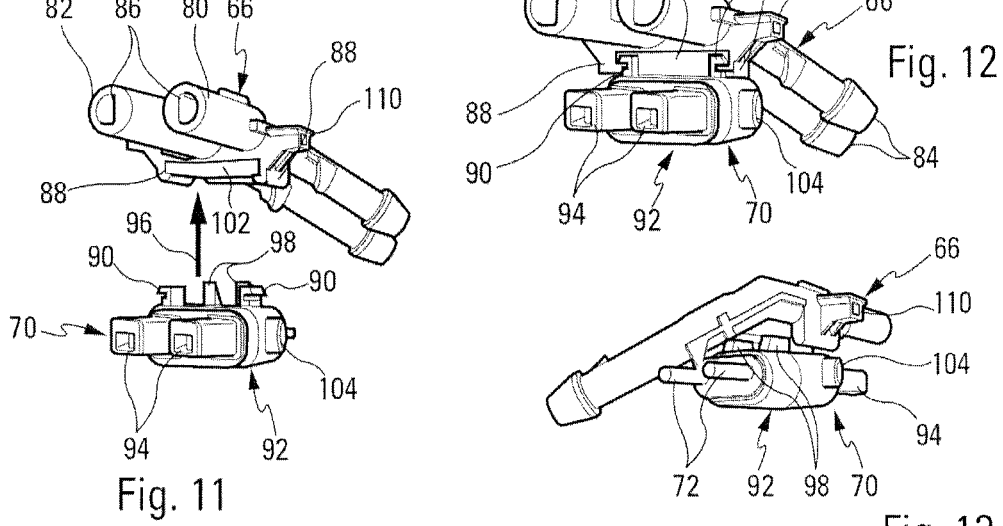
FIGS. 11 to 13 are further schematic perspective views of the electrical and hydraulic connectors of the windscreen wiper according to the invention which are separated from one another in FIG. 11 and fixed together in FIGS. 12 and 13.

As shown in FIGS. 11 and 12, the electrical connector 70 is fixed to the hydraulic connector 66 by the means for fixing 88 being resiliently clipped onto the means for fixing 90. The hooks of the means for fixing 88 are separated from one another by a predetermined distance so that they may be inserted on both sides of the hooks of the means for fixing 90 by being resiliently clipped thereto.

To implement the fixing between the connectors 70, 66, the electrical connector 70 is positioned below the hydraulic connector 66, parallel thereto, and the electrical connector 70 is displaced in translation (arrow 96 in FIG. 11) toward the hydraulic connector 66, in a direction substantially perpendicular to the longitudinal axes of the plugs 94 of the connector 70 until the teeth of the means for fixing 90 come to bear against the teeth of the means for fixing 88 of the hydraulic connector, to separate them from one another and to permit the means for fixing 90 to pass between the means for fixing 88 as visible in FIG. 12.

The body 92 of the electrical connector 70 further comprises on its upper face retaining means for the hydraulic connector 66. Said retaining means comprise two fingers 98 protruding from the upper face of the body 92 of the connector 70 and each comprising a planar bearing face 100 oriented on the side of the plugs 94. The fingers 98 are substantially parallel. They are located in this case between the planes A1 and A2. The fingers 98 are designed to bear by means of their bearing faces 100 against a transverse wall 102 of the hydraulic connector 66, visible in FIGS. 11 and 12. This transverse wall 102 extends between the small tubes 80, 82 of the connector 66. It extends downwardly from the external sectors of the small tubes 80, 82 and comprises a face oriented toward the first ends 84 of the small tubes 80, 82 and designed to cooperate by abutment with the bearing faces 100 of the fingers 98 of the electrical connector 70.

In the mounting position of the connectors 66, 70 shown in FIG. 12, the fingers 98 extend from the internal side of the wall 102 and bear by means of their faces 100 against the internal face of this wall 102. This ensures the retention of the hydraulic connector 66 toward the inside, i.e. on the side opposing the mechanical connector 62.

Laterally, the electrical connector 66 comprises two cylindrical pins 104 which protrude on their lateral faces from the body 92 of the connector 66 and extend in opposing directions. The longitudinal axes of the pins 104 and the plugs 94 of the connector 70 extend substantially in the same substantially horizontal plane. Said pins 104 are developed or extended laterally to form an axle, the length thereof being close to the width of the terminal part 64, whilst remaining less than the width to permit a displacement of the electrical connector 70 in the terminal part 64.

The mechanical connector 62 comprises on its lateral faces locking means which take the form of longitudinal extensions produced by moulding on the lateral faces of the mechanical connector 62. Said locking means have the shape of tabs 106 which have the function of cooperating with pins 104 carried by the electrical connector 70. To achieve this, the longitudinal end of each tab 106 is split in the longitudinal direction to form two parallel branches which between one another have a notch or circular cutout 108 which is shaped to receive one of the pins 104 by being resiliently clipped thereto. In contrast to the prior art (see FIG. 3) in which the tubular end pieces 18 of the mechanical connector 12 have longitudinal axes contained within a plane P1 which passes through the notches 38 of the mechanical connector 12, in this case the plane P2 (containing the longitudinal axes of the plugs 26) of the mechanical connector 62 passes through the notches 108 of the mechanical connector 62 (FIG. 8).

The branches of each tab 106 of the mechanical connector 62 are resiliently deformable and designed to be separated from one another to permit a pin 104 to pass through during the introduction of the electrical connector 70, and then to return to their initial position due to their resilience to capture said pin 104 and to prevent it from leaving the notch 108 again when the electrical connector 70 is in the mounted position, i.e. inserted into the mechanical connector 62. The presence of this notch 108 results in sufficient traction having to be applied to the electrical connector 70 in order to remove it from the mechanical connector 62, said traction being defined as being greater than the forces which are exerted during use, so that there is no inadvertent decoupling. It also generates a hard point which permits the operator to confirm correct insertion of the electrical connector 70 on the mechanical connector 62 during the mounting of the wiper 50.

Figure 14:
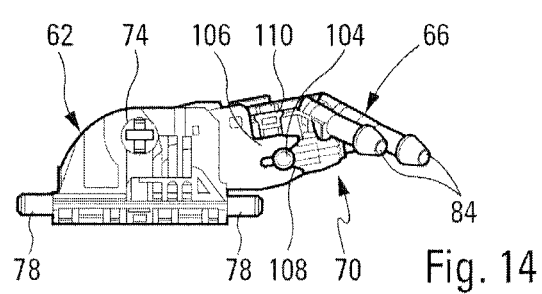
FIG. 14 is a schematic side view of the assembled connectors of the windscreen wiper according to the invention.

Although, laterally, the hydraulic connector 66 comprises two projections 110 extending in opposing directions (FIGS. 10 to 14), said projections do not cooperate with the mechanical connector 62 as is clearly visible in FIG. 14.

Thus, in contrast to the prior art, it is understood that the electrical connector 70 is fixed directly to the mechanical connector 62 by said pins 104 being resiliently clipped to the notches 108 of the mechanical connector 62. This permits the relative micro-movements between the electrical connectors 70 and mechanical connectors 62 to be restricted or even eliminated, and to ensure a permanent electrical connection therebetween.

Now will be described the replacement of a windscreen wiper 50 on an arm 52, comprising the dismantling of the worn wiper and its replacement by a new wiper.

The operator starts by placing the wiper 50 in the service position, by separating it at an angle from the longitudinal direction of the arm 52 and the terminal part 64. The hydraulic connector 66 is retained longitudinally by the electrical connector 70, the pins 104 thereof being engaged in the notches 108 of the tabs 106 of the mechanical connector 62. This movement into the service position causes the wiper 50 to rotate relative to the adapter, which remains aligned with the terminal part 64 on which it is mounted. After having detached the adapter from the terminal part 64, generally by pressing on a retractable button, the operator is able to slide the adapter into the terminal part, either by pulling on the adapter or the mechanical connector 62. By pulling on the adapter, the operator releases the pins 104 by removing them from the notches 108 of the mechanical connector 62 which permits a relative displacement of the adapter, the mechanical connector 62 and the wiper 50, in relation to the terminal part 64, until the complete detachment of the wiper 50 relative to the arm 52 is obtained.

The mounting of a new wiper is carried out in reverse. The adapter is initially opened to place it at an angle with the mechanical connector 62 and is then aligned on the terminal part 64 before being introduced into the internal volume of the terminal part 64. By continuing the action of pushing the mechanical connector 62 and the adapter against the terminal part 64, the second tubular ends 86 of the small tubes 80, 82 are inserted into the end pieces of the mechanical connector 62 and the plugs 94 of the electrical connector 70 are inserted into the plugs of the mechanical connector 62 until the pins 104 of the electrical connector 70 are engaged in the notches 108 of the mechanical connector 62. Then, the operator closes the wiper 50 against the arm 52, i.e. passes it from the service position to the position of use. The pins 104 remain blocked in the notches 108 of the mechanical connector 62 which ensures the fixing of said two parts and eliminates any risk of disconnecting the electrical connection during use. The electrical connector 70 retains the hydraulic connector 66 longitudinally relative to the mechanical connector 62 which ensures the fixing of said parts and removes any risk of disassembly of the hydraulic connection during use.

Although the invention has been described above relative to a hydraulic connector with two small tubes to supply a double manifold wiper with windscreen washer fluid, it is naturally conceivable to apply this invention to a hydraulic connector comprising one small tube to supply a single manifold wiper with windscreen washer fluid.

The invention claimed is:

1. A connection device for a windscreen wiper of a motor vehicle, comprising at least an electrical connector, a mechanical connector and a hydraulic connector, the electrical connector comprising:
    a body bearing electrical connecting plugs connected to electrical wires,
    wherein said body comprises:
        a first means for fixing in a detachable manner which cooperate directly with the mechanical connector, said first means for fixing being independent of said plugs; and
        a second means for fixing, said second means for fixing cooperating directly with the hydraulic connector,
    wherein the electrical connector is distinct from the mechanical connector and the hydraulic connector,
    wherein the mechanical connector comprises an end piece for fluidic connection which cooperate with the hydraulic connector and electrical connection plugs cooperating with the plugs of the electrical connector,
    wherein the hydraulic connector comprises an outlet end inserted into the end piece of the mechanical connector, and
    wherein the electrical connector is arranged between the hydraulic connector and the mechanical connector.

2. The connection device according to claim 1, wherein said first means for fixing protrude from said body.

3. The connection device according to claim 1, wherein said first means for fixing cooperate with said mechanical connector by being resiliently clipped thereto.

4. The connection device according to claim 1, wherein said first means for fixing comprise two pins.

5. The connection device according to claim 4, wherein said pins are coaxial and cylindrical.

6. The connection device according to claim 4, wherein said pins extend in substantially opposing directions.

7. The connection device according to claim 4, wherein longitudinal axes of the pins and the plugs extend in the same plane.

8. The connection device according to claim 1, wherein said body has a generally parallelepipedal shape, one front face thereof being connected to said plugs and two lateral opposing faces being connected to said first means for fixing.

9. The connection device according to claim 1, wherein the second means for fixing comprises one or more resilient clips and wherein said first and second means are independent of each other.

10. The connection device according to claim 1, wherein said body comprises retaining means which cooperate by abutment with the hydraulic connector.

11. A windscreen wiper of a motor vehicle, comprising:
    the connection device according to claim 1;
    wherein the hydraulic connector comprises at least one small tube having a tubular inlet end which is configured to be connected to a conduit for fluid and a tubular outlet end which is configured to be connected to the mechanical connector; and
    wherein the mechanical connector comprises electrical connecting plugs configured to cooperate with complementary electrical connecting plugs of the electrical connector, and at least one end piece for a fluidic connection which is configured to cooperate with the tubular outlet end of the small tube of the hydraulic connector, said plugs of the mechanical connector having longitudinal axes contained within a plane, said mechanical connector further comprising two parallel tabs having at their free ends notches for resilient clipping, wherein said plane passes through said notches, wherein, the only means for fixing the hydraulic connector to the mechanical connector, in a detachable manner, is by the tubular outlet.

12. The connection device of claim 1, wherein the second means for fixing is disposed on a top surface of the electrical connector and comprises two parallel hooks.

13. The connection device of claim 12, wherein each of the two parallel hooks includes an outwardly extending hooking tooth.

14. A connection device for a windscreen wiper of a motor vehicle, comprising:
a hydraulic connector comprising:
at least one small tube having a first tubular inlet end which is configured to be connected to a conduit for fluid and a second tubular outlet end which is configured to be connected to a mechanical connector of said wiper; and
an outlet end inserted into an end piece of the mechanical connector;
an electrical connector comprising:
a body bearing electrical connecting plugs connected to electrical wires,
wherein said body comprises:
a first means for fixing in a detachable manner which cooperate directly with the mechanical connector, said first means for fixing being independent of said plugs; and
a second means for fixing, said second means for fixing cooperating directly with the hydraulic connector; and
a mechanical connector,
wherein, other than said second tubular end, the hydraulic connector lacks any means for fixing in a detachable manner which are configured to cooperate with said mechanical connector of said wiper,
wherein the hydraulic connector is distinct from the mechanical connector and the electrical connector,
wherein the mechanical connector comprises the end piece for fluidic connection which cooperate with the hydraulic connector and electrical connection plugs cooperating with the plugs of the electrical connector, and
wherein the electrical connector is arranged between the hydraulic connector and the mechanical connector.

15. The hydraulic connector according to claim 14, further comprising a transverse wall comprising a face located on the side of said first tubular end and which is configured to cooperate by abutment with retaining means of said electrical connector.

16. The hydraulic connector according to claim 14, characterized in that it comprises two small tubes, said transverse wall extending substantially between said small tubes.

17. A connection device for a windscreen wiper of a motor vehicle comprising:
a mechanical connector comprising:
electrical connecting plugs which are configured to cooperate with complementary electrical connecting plugs of an electrical connector, said plugs of the mechanical connector having longitudinal axes contained within a plane;
at least one end piece for fluidic connection which cooperates with a tubular outlet end of a small tube of a hydraulic connector,
two substantially parallel tabs having at their free ends notches for resilient clipping, wherein said plane passes through said notches;
an electrical connector comprising:
a body bearing electrical connecting plugs connected to electrical wires,
wherein said body comprises:
a first means for fixing in a detachable manner which cooperate directly with the mechanical connector, said first means for fixing being independent of said plugs; and
a second means for fixing, said second means for fixing cooperating directly with the hydraulic connector; and
a hydraulic connector,
wherein the mechanical connector is distinct from the electrical connector and the hydraulic connector,
wherein the hydraulic connector comprises an outlet end inserted into the end piece of the mechanical connector, and
wherein the electrical connector is arranged between the hydraulic connector and the mechanical connector.

* * * * *